Oct. 8, 1968  H. M. VALENTINE  3,404,922
BRAKE BALANCING VALVE WITH BRAKE TARE COMPENSATING MEANS
Filed March 23, 1967

INVENTOR
HARRY M. VALENTINE

BY Scrivener Parker Scrivener + Clarke
ATTORNEY

United States Patent Office 3,404,922
Patented Oct. 8, 1968

3,404,922
BRAKE BALANCING VALVE WITH BRAKE TARE COMPENSATING MEANS
Harry M. Valentine, Elyria, Ohio, assignor to Bendix-Westinghouse Automotive Air Brake Company, Elyria, Ohio, a corporation of Delaware
Filed Mar. 23, 1967, Ser. No. 625,436
8 Claims. (Cl. 303—60)

ABSTRACT OF THE DISCLOSURE

A brake balancing valve which delivers a braking pressure to brake chambers proportional to load, proportioning being achieved through the balancing of brake valve pressure applied to a constant area piston against brake chamber pressure applied to a variable area diaphragm, the invention comprising an added area piston part of constant size which acts in concert with the first constant area piston, means being provided for delivering to the second piston part pressure inversely proportional to load in order to overcome brake tare which is defined as the inherent resistance to movement of the brake apparatus from brake release to the point where the brake shoes are in light rubbing engagement with the drum known as "brake impending" whereby the brakes subject to proportioning exert their effective share of braking effort with substantially none of the effective braking effort being utilized merely to overcome brake tare.

---

This invention relates to variable pressure ratio valves, particularly adapted for the use in braking systems, for the purpose of automatically limiting the braking effort in proportion to the load on certain wheels or axles of a vehicle.

My prior Patents Nos. 3,125,379 and 3,228,731 disclose variable pressure ratio valves, adapted for proportional braking, interposed between a manually operable brake valve and brake chambers, which deliver to the brake chambers a pressure proportional to that delivered by the brake valve, as determined by the load on the attended axle, with the brake chamber to brake valve pressure ratio being on the order of 1:4 with an empty vehicle and 1:1 with the vehicle fully laden. The variable pressure is effected through the mechanical positioning of a load sensing means, such as a lever, which positions an exhaust valve seat with respect to a plurality of fixed fingers with which a diaphragm is normally engaged; the arrangement being such that under no-load conditions the diaphragm is stripped almost entirely clear of the fixed fingers and presents an effective area to the brake chamber pressure which is approximately four times the size of the effective area of a constant area piston member, fixed through interleaved fingers, to the other side of the diaphragm and subjected to brake valve pressure. The piston member incorporates inlet and exhaust valve elements with the latter being moved to lap position in response to a predetermined brake chamber pressure in a manner well-recognized by those skilled in the art of self lapping valves. For a detailed description of the type of valve to which the present invention relates, reference is made to applicant's prior patents set forth above; particularly to Patent No. 3,228,731.

Though the patented valves operate effectively, because braking effort which is proportional to vehicle load is dependent, in part, on the variable positioning of an exhaust valve seat with respect to the fixed fingers of the body, it will be apparent that under conditions of no-load where the exhaust valve seat is positioned at its lowest point relative to the body, the effective area of the diaphragm is largest, and therefore, a brake valve pressure of approximately 25 p.s.i. is required to obtain a brake chamber pressure of 5 p.s.i., which is approximately the pressure required to overcome the brake "tare," or the forces resisting the positioning of the brake shoes adjacent to the drums, or the point of effective brake impending, or zero effective brake pressure. In this same 25 p.s.i. brake valve pressure, it is apparent that the pressure on the non-proportioned brakes produces an effective braking pressure of 20 p.s.i. That is, with a 25 p.s.i. brake application, which is the most frequent magnitude in an average day's running, the proportioned brakes would not perform any effective braking.

It is, therefore, one of the objects of the present invention to provide a means whereby all brakes, regardless of axle weights or brake proportioning, produce as nearly as possible, an effective share of braking effort.

Another object of the invention is to provide improved mechanical means for positioning a pressure regulating valve to deliver pressure in inverse proportion to the vehicle load.

Still another object is to provide a means whereby the pressure to a supplemental area on the piston is varied for various positions of the exhaust valve, as established by the vehicle load, to compensate for the tare pressure on the brake chamber diaphragm.

Yet another and the broad principal object of the invention is to provide, for any position of the exhaust valve seat, a fixed pressure supplementing the delivered brake chamber pressure, for the purpose of producing, as nearly as possible, equal braking efficiencies on proportioned and non-proportioned axles irrespective of the loads.

In accordance with the invention the foregoing objects are accomplished by the use of auxiliary control pressure to pre-position the constant area piston and valve elements in close adjacency to the load-positioned exhaust valve seat, the control pressure also being a function of the load as determined by auxiliary load responsive mechanisms constructed in accordance with the invention.

For an understanding of the invention, reference is made to the following detailed description and the accompanying drawings wherein.

Figure 1:
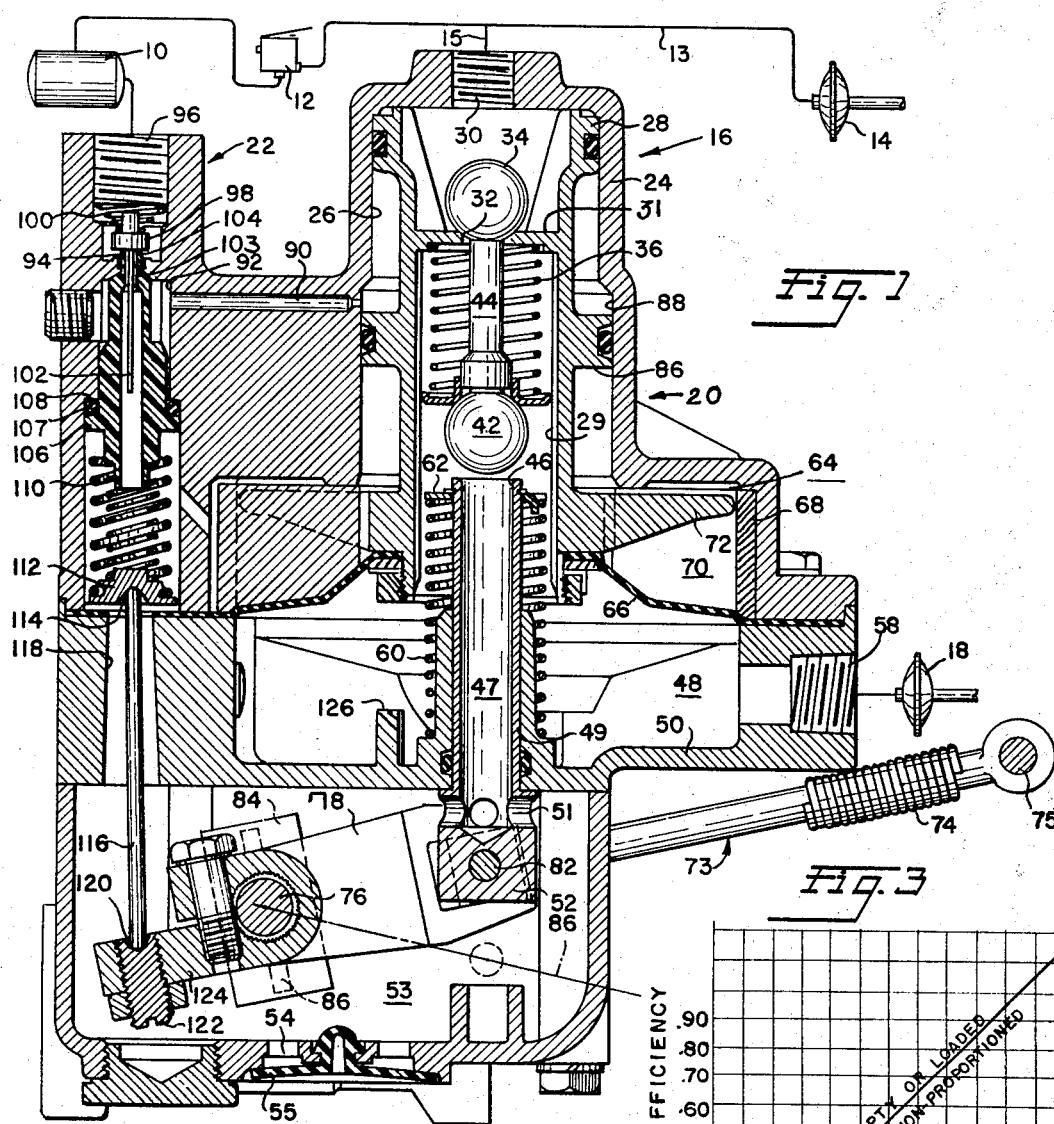
FIG. 1 is a partly schematic vertical cross sectional view of a valve embodying the features of the present invention.

Referring now to the drawings, the numeral 10 represents a fluid pressure reservoir which is connected in the usual manner to the inlet of a conventional pedal operated brake valve 12 having an outlet which may be connected directly by conduit 13 to a vehicle front brake chamber 14. The outlet of the brake valve is also connected by way of a branch conduit 15 to a proportioning valve 16 interposed between the brake valve 12 and a second rear brake chamber 18. The valve 16 is divided into a first proportioning valve part 20 and a second control part 22 and except for the modifications occasioned by the present invention as fully described hereinafter, the proportional valve part 20 is substantially the same as the valve shown and described in my prior Patent No. 3,228,731 to which reference is hereby made for a complete description. Briefly the valve part 20 includes a casing 24 defining a cylinder 26 slidably receiving a constant area piston 28 whose interior is hollow to define a cylindrical cavity 29. The cylinder 26 is connected to the delivery side of the brake valve 12 through an inlet port 30, and through the upper center wall 31 of the piston is a delivery port 32 normally closed by an inlet valve 34 which is urged towards its closed position by a spring 36 interposed between the lower side of the wall 31 and an exhaust valve 42 within the cavity 29 and rigidly connected to the inlet valve by a stem 44.

With the parts of the valve in the position shown in the drawing, which is the no-air or vehicle loaded position as will become apparent hereinafter, the exhaust valve is spaced above an exhaust valve seat 46 at the upper end of a hollow plunger 47 extending into a delivery cavity 48 and slidably received in a necked opening 49 through the lower wall 50 of the cavity 48. The interior of the plunger 47 is connected by way of ports 51, in an enlargement 52, with an exhaust chamber 53 connected at all times with atmosphere through ports 54 and dust guard 55. The brake pressure delivery cavity 48 is connected by a delivery port 58 with the brake chamber 18 and the plunger 47 is at all times urged towards its raised position of the drawing by a spring 60 interposed between the wall 50 and a collar 62 adjacent the upper end of the plunger. As can be seen, the cavity 29 in the hollow piston 28 is at all times in direct open communication with the delivery cavity 48 and when the exhaust valve is open the cavity 48 and hence the brake chamber 18 are connected to atmosphere and when the exhaust valve is closed and the inlet valve 34 is open the cavity 48 is in direct communication with the inlet port 30 leading to the outlet port of the brake valve 12.

Immediately above the delivery cavity 48 is a cavity 64 which is separated from the cavity 48 by a diaphragm 66 whose outer periphery is sealed between upper and lower parts of the valve casing as shown. The inner part of the diaphragm is sealingly connected to the lower end of the hollow piston 28 and is thus constrained to move with the piston. Contained within the cavity 64 is an annular ring 68 having integral therewith a plurality of radially inwardly extending fingers 70 which are interleaved with a plurality of radially outwardly extending fingers 72 carried by the lower end of the piston 28. As fully explained in my Patent No. 3,228,731 the respective fingers 70, 72 have diverging sloping surfaces whereby, as the piston is moved downwardly, the diaphragm is stripped off the upwardly and inwardly sloping surfaces of the fixed fingers 70 and is picked up by the upwardly and outwardly sloping surfaces of the moving fingers 72. However when the plunger 47 and exhaust valve seat 46 are in the extreme upper position of the drawing, and when the exhaust valve 42 engages the seat 46 almost all of the motive area of the diaphragm 66 is borne by the fixed fingers 70 whereby the diaphragm is substantially ineffective and the piston 28 is subjected merely to the opposing forces of the pressure delivered by the brake valve to its upper end and the pressure operating on substantially the same effective area at its lower end, resulting in a brake chamber pressure which is substantially equal to brake valve pressure, and this is the desired condition when the vehicle is fully loaded and proportional braking is not required.

When the exhaust plunger 47 and seat 46 are moved to their lower most position by means responsive to loading, as will be explained, the diaphragm must strip entirely off the fixed fingers 70 and be engaged exclusively by the movable fingers 72 before the valve 42 engages seat 46 so that when valve 34 is opened the opposing forces acting on the piston are balanced by a large pressure acting on the relatively small fixed area at the upper end of the piston 28 and a proportionately lower pressure acting on the relatively large area across substantially the entire area of the diaphragm 66 whereby the brake chamber pressure is proportionately less than the brake valve pressure, depending upon the ratios of the fixed area of the piston and the effective area of the diaphragm.

Preferably, the exhaust valve seat 46 is positioned in accordance with vehicle load by mechanical means extending between sprung and unsprung parts of the vehicle and the positioning means shown in the drawing comprises a two part lever 73 which includes a spring 74 whereby one part of the lever may oscillate with respect to the other to damp the offects of over-the-road operation. The outer end of the lever 73 is connected to the axle 75 of the vehicle and the valve housing 24 is connected to the chassis of the vehicle with the inner end of the lever 73 being connected to a rotatable shaft 76 which extends into the chamber 53 at the lower end of the valve and has connected thereto a bifurcated arm 78 straddling the enlarged lower end 52 of the exhaust plunger 47 and pivotally connected thereto by means of a pin 82. Desirably the shaft 76 extends through a damping chamber 84, filled with viscous fluid, connected to a side of the valve housing and carries a vane 86 which serves to further dampen the effects of vehicle bouncing caused by over-the-road operation.

From the foregoing description, it will be apparent that when the vehicle is heavily loaded, the axle 75 and chassis move closer together so that the lever partakes of the position shown in the solid lines. When the vehicle is lightly loaded the chassis is moved vertically further away from the axle and the lever partakes of the position shown by the phantom line 86.

As so far described, the valve is essentially the same as that described in my Patent No. 3,228,731. The valve of the present invention differs from the patented valve in that it provides an added incremental pressure receiving area which acts in concert with the constant area piston to provide the necessary effort to overcome resistance, known as brake tare, opposing movement of the brake from its release position to the point of brake application or "brake impending," i.e., where the brake shoes are in light rubbing engagement with the drums. The invention provides auxiliary variable pressure proportioning means for delivering to the incremental area a pressure which is inversely proportional to load, whereby, as will become more apparent hereinafter, upon brake application, even with the vehicle in a no-load condition, a pressure is delivered to the brake chambers which, first, is sufficient to overcome brake tare which may be on the order of 5 p.s.i. and, second, provides an additional pressure which is proportional to the load on the axle and may be on the order of 3 p.s.i. so that the brakes actually perform an efficient braking function, which would not be the case where the proportional braking pressure is less than the tare pressure, as in the illustrative values, in which event the brakes would perform no braking function at all.

In accordance with the invention, the foregoing results are achieved by the provision of a differential area piston member 86 integral with the main piston 28 but having a greater external diameter and being slidably received in a complementary cylinder part 88 which communicates by way of a passage 90 with a control cylinder 92 connected through a control port 94 with an inlet port 96 in direct communication with a source of auxiliary pressure which may be the reservoir 10. The port 94 is controlled by a normally open valve 98 which is urged towards closed position by the spring means 100 shown. The underside of the valve 98 has connected thereto a rod 102 slidably carried in an exhaust passage 103 in an upstanding projection 104 whose upper annular edge defines an exhaust seat which is also controlled by the valve 98. The projection 104 is of less diameter than the control port 94 and is integrally connected to the upper end of a control piston 106 which is urged upwardly against a shoulder 108 through air seal 107, by means of suitable graduating springs 110 interposed between the lower end of the piston and a spring follower 112.

The lower side of the follower 112 is recessed at 114 to receive the upper end of a rod 116 extending downwardly through a passage 118 to be received at its lower end in a recess 120 formed in an adjusting screw 122 carried in an extension 124 of the bifurcated arm 78 which serves to control the position of the exhaust valve seat 46 in accordance with vehicle loading as previously described.

In operation, assume first, that the vehicle is heavily loaded so that the parts of the valve and control mechanism occupy the position of the drawing. Under these conditions the part 124 of lever 73 is in its lower most position and the graduating springs 110 are at their maximum extension and only a very slight pressure, on the order of 5 p.s.i. is required to move the control piston 106 downwardly and effect lapping of the control valve 98. The pressure thus delivered to the differential piston 86 is insufficient to overcome the frictional resistance of the piston 28 so that upon a brake application the brake valve and brake chamber pressures are substantially equal as if the proportional valve were not in the system.

When the vehicle is partly loaded so that the control lever 73 is in a substantially horizontal position whereby the exhaust plunger 47 and port 46 are moved downwardly and the control rod 116 at the left hand end of the bifurcated member 78 is moved upwardly by part 124 of lever 73 to compress the spring means 110, considerably greater control pressure is now required to act on the piston 106 to move it downwardly against the increased upward force of the springs until the valve 98 is lapped, thus greater control pressure flows through the passage 90 onto the added area piston 86 to provide sufficient force to compensate for the additional upward force on the diaphragm, due to its increased effective area, as a result of the lower position of the exhaust valve 46, as determined by the position of the lever 73. It should be noted, for example, that 5 p.s.i. on the piston 28 plus the increased proportioned pressure on piston 86, due to the position of the lever 124, will equal 5 p.s.i. delivered pressure on the increased effective area of the diaphragm, which is approximately the brake chamber pressure required to compensate for the brake tare. It will be apparent that as the vehicle load decreases the lever 73 moves downwardly, and with it the exhaust stem 47, while the lever 124 moves upwardly, increasing the load on the springs 110, and thereby increasing the pressure delivered to the piston 86, by the pressure regulating valve, so that at this new position of the diaphragm, where its effective area is increased, as a result of the lowered position of the exhaust valve 46, a new balance of forces results. Now, upon a brake application the initial 5 p.s.i. on the piston 28 plus the increased pressure on the piston 86 equals a lap pressure of 5 p.s.i. on the increased effective area of the diaphragm and is the pressure delivered to the brake chamber to compensate for brake tare. Any additional increase in brake application pressure is henceforth proportioned as effective braking pressure suited to the axle load.

As mentioned, under fully loaded conditions the inlet valve 32 is closed, due to insufficient pressure on the piston 86. However, under partially loaded conditions due to increased pressure on the piston 86 the exhaust valve 42 is closed and the inlet valve is opened various amounts, reaching a maximum opening under empty conditions when the diaphragm retainer abuts a stop 126 in the body.

Naturally the spring means 110 must be carefully correlated with the internal frictional resistance of the valve elements and the position of the exhaust seat 46 or the effective area of the diaphragm so that when 5 p.s.i. is delivered to the valve at port 30 the valve will deliver or lap with 5 p.s.i. at the port 58 irrespective of the loading condition. Desirably, the spring means are adjusted in a manner recognized in the art so that the control valve 98 laps just when sufficient pressure is delivered to the added area piston 86 to move the piston to the point where the exhaust and inlet valves of piston 28 lap at a supplied and delivered pressure, at the value of 5 p.s.i.

Obviously, where the vehicle is in no-load condition so that the exhaust valve seat 46 is moved to its lowermost position, the control springs 110 are compressed to their maximum so that maximum control pressure is required to act on the control piston 106 to move it to a valve lapped position.

Figure 2:
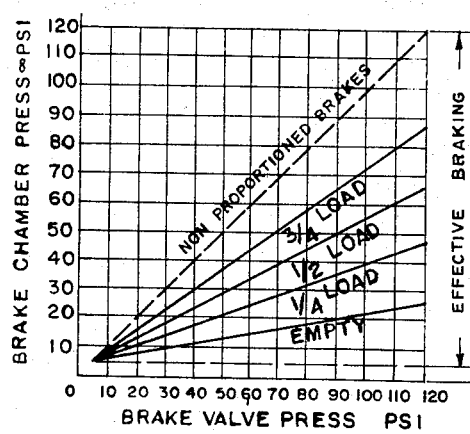
FIG. 2 is a graphical representation of characteristics of the valve of the present invention.

FIG. 2 illustrates graphically the effect of load on the ratio of brake chamber pressure to brake valve pressure; it being noted that in empty condition, chamber pressure is in the approximate ratio of 1:4 of brake valve pressure whereas at full load the ratio is 1:1. In any event, regardless of the loaded condition of the vehicle when the brake valve is initially opened to deliver pressure up to 5 p.s.i. this same pressure is received in all of the brake chambers regardless of whether they are subject to proportioning or not. Furthermore, because of the contol afforded by the control valve part of the present invention this 5 p.s.i. pressure as well as any proportioned pressure is delivered to all of the brake chambers substantially simultaneously irrespective of the load condition of the vehicle and the consequent degree of proportioning and it is this feature which is the principle function of the invention and is effectively accomplished thereby.

Figure 3:
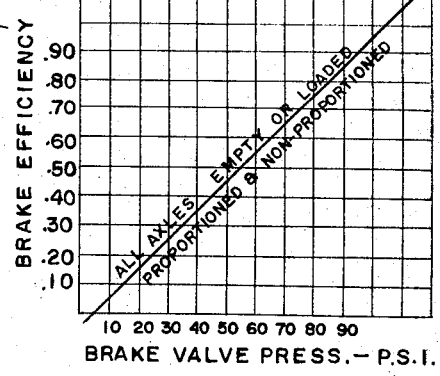
FIG. 3 is a graphical representation of certain other characteristics of the invention.

FIG. 3 illustrates graphically the effects of proportional braking on the overall brake efficiency versus brake valve pressure. It will be noted that each axle, irrespective of its load, proportioned or not, does its share of the vehicle braking. Further, it will be noted that for a given brake valve application the brake efficiency, or the ratio of total braking effort at the wheels to the total vehicle load, commonly referred to as the K factor, throughout the system, is the same.

It will be apparent to those skilled in the art that the valve of the invention is susceptible of a variety of changes and modifications without, however, departing arom the scope and spirit of the appended claims.

What is claimed is:

1. In a variable brake pressure regulator valve responsive to vehicle load for controlling the application of fluid pressure from an inlet to an outlet and thence to a brake chamber via a differential pressure responsive member having a changeable ratio of its effective motive areas and including integrally connected inlet and exhaust valves, said member having a constant effective motive area subjected to the pressure at said inlet and a variable effective area subjected on one side to the pressure at said outlet, said member being movable in a brake applying direction upon increase in pressure on said constant area above a predetermined level and in a brake releasing direction upon decrease of pressure below a predetermined level, the invention which comprises an added effective motive area of constant size carried by said member independently of said first constant effective motive area and means for applying control pressure to said added area, the added area being selected so that the pressure acting thereon provides a force which acts in concert with the pressure force applied to said constant area member whereby the combined forces up to a predetermined tare force admit to said brake chamber an initial pressure overcoming said tare force.

2. The regulator valve of claim 1 wherein the control pressure applying means includes pressure regulating means for regulating pressure applied to said added area so that it is inversely proportional to vehicle load.

3. The regulator valve of claim 1 wherein the means for applying control pressure to said added area comprises a normally open control valve for controlling the flow of fluid pressure from a control port to said added area, and fluid pressure responsive means responsive to predetermined pessure acting on said added area for moving said control valve to closed position.

4. The regulator valve of claim 3 wherein the pressure responsive means comprises an element having a motive area exposed to the pressure acting on said added area, and graduating spring means acting on said element in opposition to said pressure to retain said valve opened until the pressure on said added area is at a predetermined value.

5. The regulator valve of claim 4 including means for changing the loading of said graduating spring means inversely with the load condition on the vehicle to increase the magnitude of the control pressure required to move said element to a position closing said control valve as the load on the vehicle is decreased.

6. The regulator valve of claim 5 wherein the load responsive means comprises a lever having a part connected to the axle of the vehicle, a second part connected to the chassis of the vehicle, and a third part operatively bearing on said graduating spring means to increasingly compress the same as the chassis and axle move apart in response to decrease in load on the vehicle.

7. The regulator valve of claim 6 including screw threaded adjusting means carried by said third part of said lever for varying the limits of the control pressure operable to move said element to positions effecting closing of said control valve.

8. The regulator of claim 5 including mechanical means responsive to load for effecting increase in the effective motive area of the variable part of said member as the load is decreased and vice versa, and means cooperating directly with said mechanical means for varying the compression of said spring means so that the compression thereof is increased as the load on the vehicle is decreased and vice versa.

References Cited

UNITED STATES PATENTS 3,011,833 12/1961 Stelzer _____ 303—60
3,228,731 1/1966 Valentine _____ 303—60

MILTON BUCHLER, *Primary Examiner.*

E. G. BOTZ, *Assistant Examiner.*